United States Patent [19]
Tabuchi et al.

[11] Patent Number: 5,799,181
[45] Date of Patent: Aug. 25, 1998

[54] BOSSLESS ARCHITECTURE AND DIGITAL CELL TECHNOLOGY FOR COMPUTER PROGRAMS

[75] Inventors: Daisuke Tabuchi; Wataru Shoji; Ichiro Nakajima, all of Tokyo, Japan

[73] Assignee: Sofmap Future Design, Inc., Tokyo, Japan

[21] Appl. No.: 539,806

[22] Filed: Oct. 5, 1995

[30] Foreign Application Priority Data

Apr. 7, 1995 [JP] Japan ................................. 7-107066
Jun. 6, 1995 [JP] Japan ................................. 7-139385

[51] Int. Cl.$^6$ ........................................................ G06F 9/00
[52] U.S. Cl. .................. 395/590; 364/262.4; 364/DIG. 1
[58] Field of Search ........................ 395/800.18, 590, 395/701; 364/262.4, DIG. 1

[56] References Cited

U.S. PATENT DOCUMENTS

| | | | |
|---|---|---|---|
| 4,724,521 | 2/1988 | Carron et al. | 395/712 |
| 5,339,430 | 8/1994 | Lundin et al. | 395/700 |
| 5,369,766 | 11/1994 | Nakano et al. | 395/700 |
| 5,404,529 | 4/1995 | Chernikoff et al. | 395/700 |
| 5,590,271 | 12/1996 | Klinker | 395/326 |

FOREIGN PATENT DOCUMENTS

| | | |
|---|---|---|
| 547 622 | 6/1993 | European Pat. Off. |
| 566 482 | 10/1993 | European Pat. Off. |
| 578 391 | 1/1994 | European Pat. Off. |
| WO/9428480 | 12/1994 | WIPO |

*Primary Examiner*—John E. Harrity
*Attorney, Agent, or Firm*—H. C. Chan

[57] ABSTRACT

A bossless computer program architecture in which each program module is hierarchically equal is used to develop complicated software applications. Each program module is associated with a parameter file. The characteristics and operation of the program modules are determined by their associated parameter files. These modules communicate by writing statements to the parameter files associated with other modules. Once written, the origin of these statements is ignored. Thus, there is no need to "return" to the modules which originate the statements. Further, the statements are executed by the modules without regard to their origins. This new architecture does not require the preservation of linkage information because there is no need for the program modules to return information or control to other modules. Various applications of this architecture to windows-based environment and multimedia applications are disclosed.

8 Claims, 13 Drawing Sheets

BOSSLESS ARCHITECTURE AND DIGITAL CELL TECHNOLOGY FOR COMPUTER PROGRAMS

FIELD OF INVENTION

This invention relates to computer program architecture, and more particularly relates to a program architecture in which program modules are not controlled by another module.

BACKGROUND OF THE INVENTION

Conventional computer program architecture consists of a main program and a plurality of program modules. The main program typically controls and coordinates the operation of the program modules. FIG. 1 is a schematic diagram of a program 100 having such an architecture. In FIG. 1, a main program 102 contains a plurality of statements, such as 104 and 106. Some of the statements could be CALL statements, such as statements 108 and 110. These two CALL statements, when executed, will invoke program modules 120 and 130. Main program 102 may contain a LOOP statement which causes main program 102 to execute continuously in a loop. Main program 102 also contains a STOP statement for terminating the program. It should be appreciated that program 100 could be written in different programming languages, and the precise syntax of the statements and program structure could vary with the programming languages.

Program 100 contains a plurality of program modules, such as modules 120 and 130, called by main program 102. Module 120 contains a plurality of statements, such as statements 122 and 124. It could also contain a plurality of CALL statements, such as statement 126. This statement, when executed, will invoke another module 140. Finally, module 120 contains a RETURN statement.

When CALL statement 108 is executed, main program 102 jumps to module 120. Statements 122, 124 and the rest of the program are executed. Upon executing the RETURN statement in module 120, program 100 returns to statement 106, which is the statement following CALL statement 108. At this time, the control of program 100 is returned to main program 102. Main program 102 continues to execute.

The structure of all the modules is similar to that of module 120. Similarly, the jump-return mechanism, described above, is carried out by all the CALL statements in program 100. Consequently, they will not be further described in this specification.

In order to carry out this jump-return mechanism, the return addresses of the CALL statements need to be saved in RAM (typically in a memory structure called a stack). Other essential state information of the computer prior to jumping to the called module, such as values of registers, may also be saved if there is a need to do so (e.g., when jumping to an interrupt service routine). Thus, when main program 102 calls module 120, the contents of these registers may also be pushed (i.e., saved) in the stack. Similarly, when module 120 calls module 140, the return address of module 120 also needs to be saved. The contents of appropriate registers may need to be pushed in the stack. Thus, the size of the stack could be large when a large number of CALL statements are executed.

When a RETURN statement is executed, the return address is used to return to the calling program. The saved information is also retrieved.

Typically, a program in the above described conventional architecture contains many CALL statements and many modules. These modules could call other modules (e.g., module 120 can call module 140), thereby forming a chain of CALL statements. The precise history of this chain needs to be preserved so that the last called module can return to the main program. One of the problems of the conventional architecture is that the time to travel the chain could be very long. As pointed out above, each time a CALL statement is invoked, certain amount of state information needs to be saved, resulting in overhead in execution. Each time a RETURN statement is executed, the saved information needs to be restored, again requiring overhead in execution. As a result, the execution speed of programs written using conventional architecture is slow.

The following are some of the characteristics of the conventional architecture: (a) there is a controlling ("boss") program, e.g., main program 102, (b) all the linkage information (e.g., return address and registers) needs to be preserved when one part of the program (a calling program such as main program 102 or some of the modules) transfers execution to another (the called program), and (c) the linkage information is used to return control and information to the calling program. This architecture could be called a "boss" architecture. The calling module can be considered a master while the called module can be considered a slave executing commands issued by the master and then reporting results to the master.

Recently, other programming architectures have been developed. However, they are also based on the boss architecture. One example is object-oriented programming. This method allows codes to be reused and applications developed relatively rapidly. However, the applications still have a controlling body which adds tremendous overhead.

Advances in program architecture have also been made in operating environments. One example is an interprocess communication protocol called dynamic data exchange (DDE) used in Microsoft's MS Windows environment. DDE uses a shared memory to exchange data between processes and a protocol to synchronize the passing of data. The heart of DDE protocol is the DDE message. A process (client) can ask another process (server) to perform a service. Specifically, the client issues a WM_DDE_EXECUTE message to post a command to the server by storing a command string in a global memory block and passing to the server a handle to the global memory block. The server subsequently returns a WM_DDE_ACK message to the client. If the server successfully executes the command, the WM_DDE_ACK message would return a TRUE value to a DDEACK structure member labelled "fAck." If the command is not successfully executed, the server posts a WM_DDE_ACK message with "fAck" set to FALSE. When the client receives the WM_DDE_ACK message from the server, it deletes the command string from global memory and proceeds to take appropriate actions accordingly.

It is clear that interprocess communication via DDE has many characteristics of the conventional architecture shown in FIG. 1. Specifically, the preservation of linkage information and the return of control to the client are important aspects of DDE. While the architecture of FIG. I stores the content of a few registers and the return address in each interprocess communication, DDE uses elaborate commands and data structure. As a result, DDE is even less efficient than the architecture of FIG. 1.

Another example of new developments in operating environment is an architecture used in MS Windows called OLE (Object Linking and Embedding). This architecture allows one application (e.g., a word processor program) to be linked to one or more applications (e.g., a spreadsheet program). In the terminology of OLE, applications can be classified as client applications and server applications. MS Windows uses a "registration database" to maintain a collection of information about OLE applications and file extensions for MS Windows applications. All communication between applications is handled by OLE. Specifically, OLE applications communicate through the use of three dynamic-link libraries: OLECLI.DLL, OLESRV.DLL, and SHELL.DLL. The SHELL.DLL enables applications to communicate with the registration database. The OLECLI.DLL is the OLE client library and the OLESRV.DLL is the server library. The OLE server and client libraries communicate with each other through DDE messages. The typical path of communication for an OLE function includes the call of the function, DDE messages between OLE libraries, and disseminating information to the client and server applications.

In one example, when the OLESRV.DLL library receives notification from the OLECLI.DLL library that a client application needs an object, the OLESRV.DLL library calls appropriate server methods. For example, OLESRV.DLL calls a ServerOpen( ) method when a user activates an object in an OLE client application. The server application then performs the operation of the ServerOpen( ) method. If ServerOpen( ) is performed successfully, the method returns OLE_OK. If ServerOpen( ) is not performed successfully, an OLE_ERROR_OPEN is returned. The client application can then take appropriate actions.

The registration database in OLE contains the linkage or history of the applications. The registration database and the client-server structure of OLE form a boss architecture. Further, even a simple communication between applications requires the involvement of many Windows components (e.g., DDE, dynamic-link libraries, etc.). It is well-known that MS Windows applications require a lot of memory and processor bandwidth. The boss architecture together with the complicated structure of MS Windows' components could be one reason for the slow performance.

SUMMARY OF THE INVENTION

The present invention involves a novel bossless computer program architecture comprising a plurality of program modules called "cells." Under this architecture, each cell is hierarchically equal, i.e., there is no controlling (or boss) cell. An application can start from any cell, and can terminate at any cell.

Each cell is associated with a file, called a DNA file. The characteristics and operation of the cells are determined by their associated DNA files. Cells communicate by writing statements to the DNA files associated with other cells. Once written, the origin of these statements is ignored. Thus, there is no need to "return" to the cells which originate the statements. Further, the statements are executed by the cells without regard to their origins.

The cells execute statements in their associated DNA files. These statements are executed sequentially. The cells retain full control of the execution, i.e., there is no need to turn over execution to other cells during or after the execution of statements. There is no need to report to other cells on the status or results of execution.

In one embodiment of the present invention, a computer program architecture comprises at least a first and a second program cell each containing program instructions. The second cell contains program instructions for issuing a first set of one or more commands. One form of commands is the above described statements written to DNA files. However, the commands could be other means for causing cells to perform desired operations. The first cell contains program instructions for automatically executing the first set of commands without return results of executing the commands to the second cell. The first cell further contains program instructions for issuing a second set of commands. The second cell contains program instructions for automatically executing the second set of commands without returning results of execution to the first cell.

The cells of this application can launch another program cell (the third cell). This new cell is at the same hierarchial level as the other two cells, and can execute commands without returning results of execution to any cell, including the launching cell. The third cell can cause the first two cells (including the launching cell) to terminate while it continues to run.

This new architecture does not require the preservation of linkage information because there is no need for the cells to return information or control to other cells. This architecture is flexible because each cell is hierarchically at the same level as other cells, thus can be selected to perform a certain task based only on its ability instead of on its hierarchic level. For example, when there is no need for a cell to exist, it can be removed from an application. On the other hand, program modules in conventional boss architecture cannot be removed arbitrarily. For example, the main program cannot be removed, even if it is not performing any useful function.

The present invention also involves a novel method of interaction between program cells forming an application. In this method, a second cell performs a step of sending a first set of statements to a file associated with a first cell. The first cell performs a step of executing the first set of statements automatically without any prompting by a user. There is no need for the first cell to return results of execution to the second cell.

Other cells can also perform the step of sending statements to the file associated with the first cell during or after execution of the first set of statements. The first cell executes the first set of statements and the new statements sequentially without making any distinction regarding their origins. The first cell does not need to take any special action between the end of executing the first set of statements and the beginning of executing the new statements. As far as the first cell is concern, the first set and the new statements form a continuous list of statements ready to be executed sequentially.

In applications formed by a plurality of cells, each cell can issue statements to another cells without going through a chain of cells. The mode of interaction of the present invention is direct (i.e., from one cell to another directly instead of through a chain of modules). As a result, the structure of an application is simple and the execution speed is fast.

These and other features and advantages can be understood from the following detailed description of the invention together with the accompanying drawings.

DETAILED DESCRIPTION OF THE INVENTION

The present invention is directed to a novel computer program architecture. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 2A:
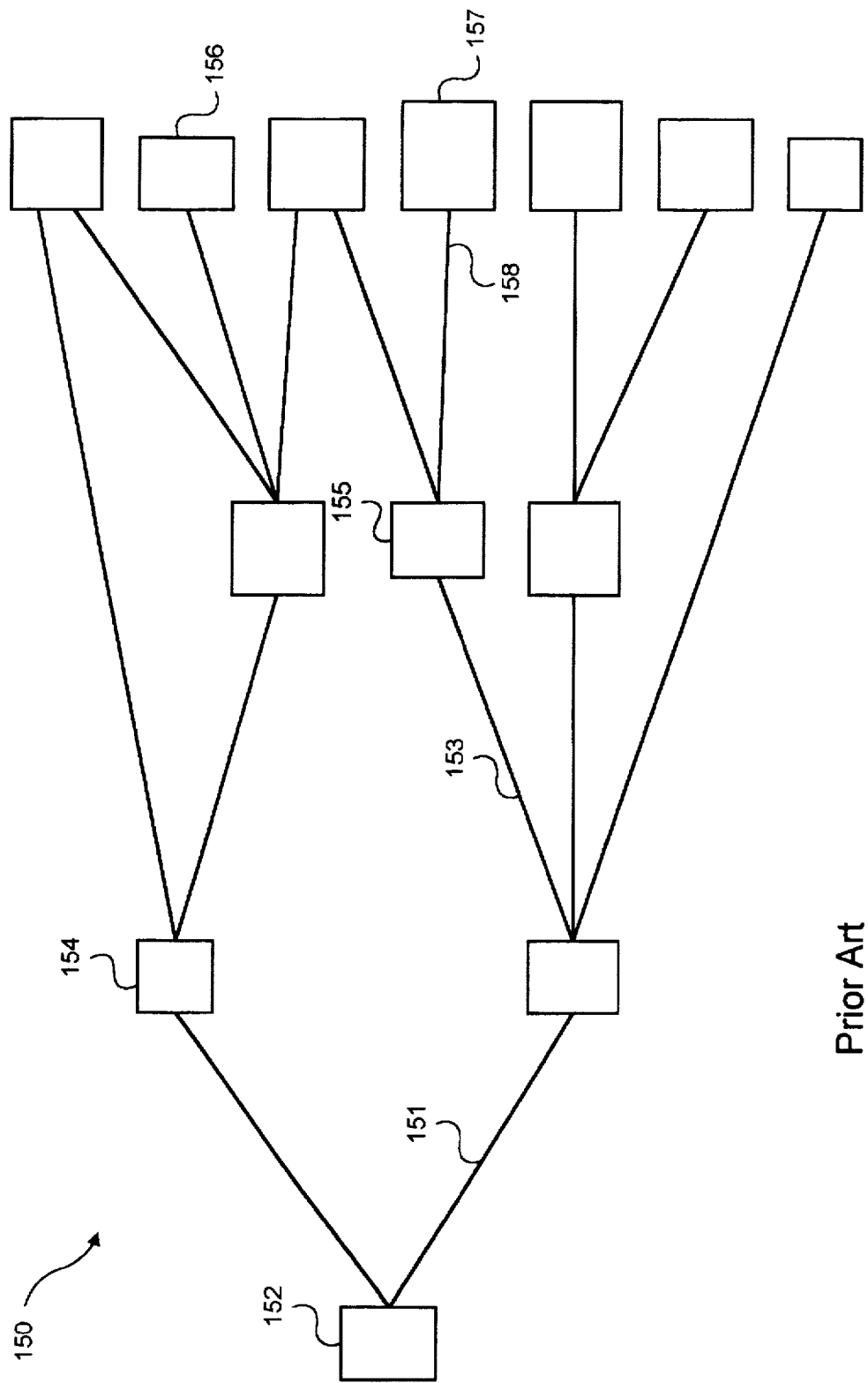
FIGS. 2A and 2B show a comparison between prior art architecture and the architecture of the present invention.
Figure 2B:
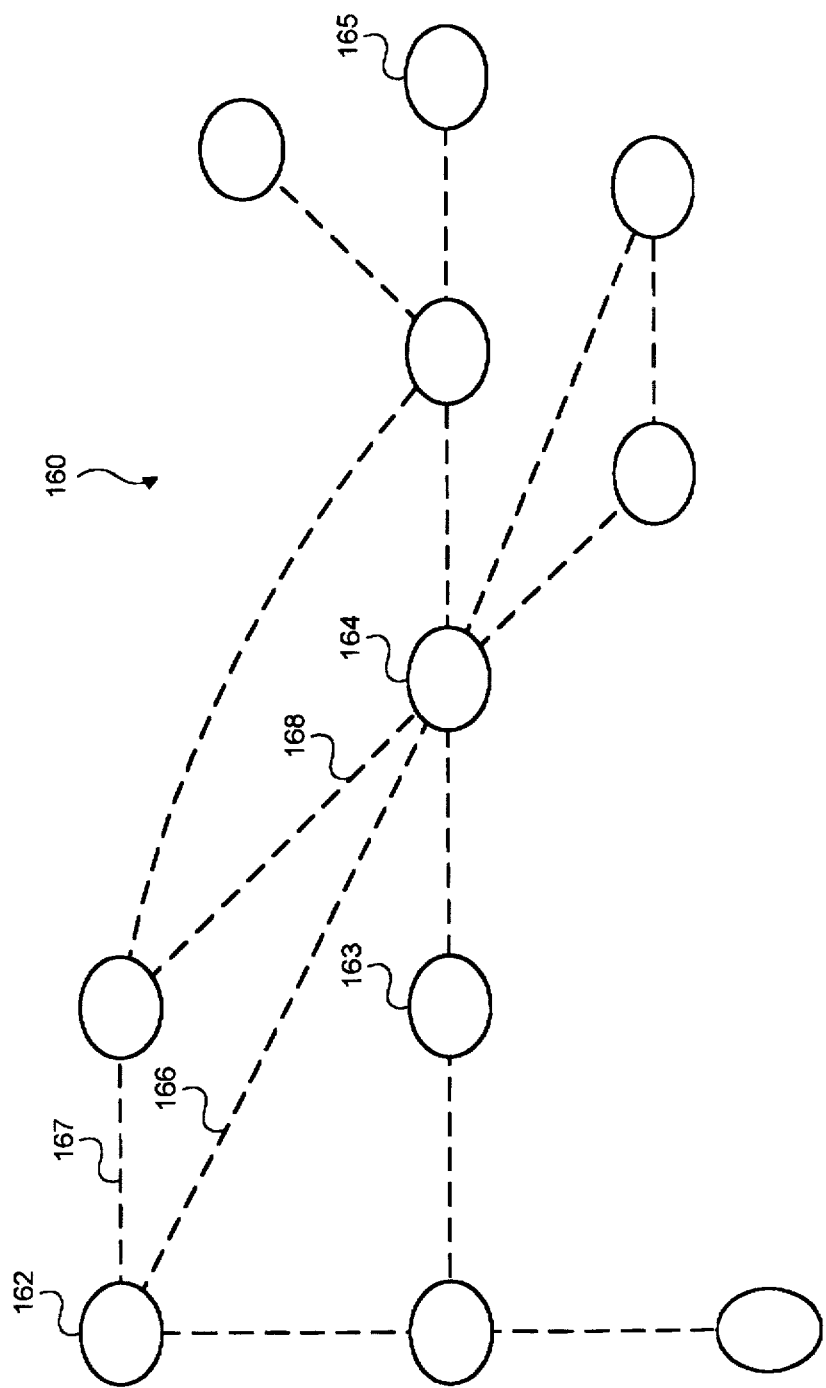

The architecture of the present invention is called a "bossless" architecture because every program module is on equal footing with other program modules. There is no module that controls the overall operation of the program (i.e., no boss). A comparison of the bossless architecture and the boss architecture is shown in FIG. 2. FIG. 2A is a schematic view of an application 150 based on the boss architecture. The architecture is in the form of a hierarchic structure, and a boss module 152 controls a plurality of modules, such as modules 154–157. Solid lines running from the boss to the individual modules are used to graphically depict the chains of command and linkage. When a program module in the lowest level (i.e., module 157 at the end of a branch) is executing, solid lines (i.e., links) 151, 153 and 158 from the boss to that program module must be maintained. FIG. 2B is a schematic view of an application 160 based on the bossless architecture of the present invention. Application 160 comprises a plurality of program modules, such as modules 162–165. Each program module (called a "cell" in the present invention) is the same as the other cells in an hierarchical sense. Cells are linked together in a novel way in which no history or linkage information needs to be retained. Each link is independent. For example, there is no need for links to be active simultaneously. Each link is direct, i.e., two cells can be linked directly without the need of using one or more intermediate links. For example, cells 162 and 164 can be linked directly using line 166 instead of using lines 167 and 168 and passing through an intermediate cell. An application can be formed by defining the cells involved and using the novel link of the present invention. This is different from the situation in FIG. 2A where the link from the boss to the module at the lowest level must be active at all time while the module is executing. In FIG. 2B, dashed lines are used to graphically depict the novel interaction of the present invention.

Figure 3:
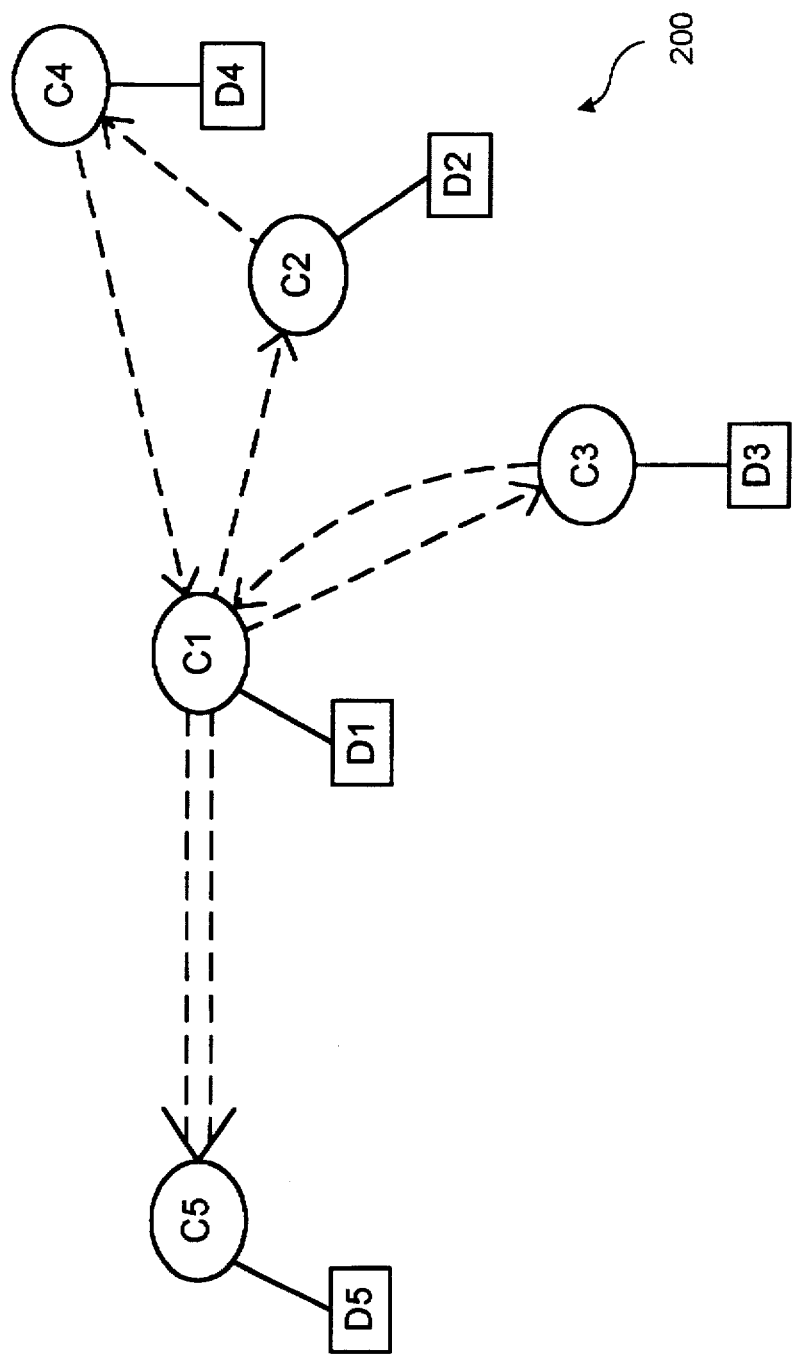
FIG. 3 is a diagram showing the interaction of cells in accordance with the present invention.

FIG. 3 is a drawing showing the structure of an application 200 using the bossless architecture of the present invention. Application 200 contains a plurality of cells, labeled as C1–C4, loaded and executing in RAM. Each cell has an associated file (labeled as D1–D4), called DNA file, which contains information of the cell. The term "DNA" is used here in analogy with the biological relationship between a living cell and its DNA. At a desired time, cell C1 can send statements (called "DSF statements") to cell C2 using a protocol called digital shifting function ("DSF") protocol. Cell C2 will execute these statements. The detail structures of cells, DNA files and the DSF protocol will be described below.

One important distinction of the present invention from conventional inter-process communication is that cell C2 does not retain information on the origin of these statements, i.e., no history of the inter-process communication is kept. Thus, once cell C1 completes its writing of DSF statements to cell C2, there is no further linkage between cells C1 and C2. Cell C2 does not know the origin of these statements during their execution. It is possible for cell C1 to later establish communication with cell C2 again by sending another set of statements to C2. However, this communication is separate from the previous communication, and terminates once the new set of DSF statements is sent.

Each of the cells can send DSF statements to any of the cells it desires. Thus, cell C1 can also send statements to cell C3. Similarly, cell C2 can send statements to cell C4, which in turn can send statements to cell C1. Cell C3 can also send statements to cell C1.

In this example, cells C1 and C2 are not bosses to C4. For example, when C4 is executing DSF statements, there is no need to maintain any links between cells C1 and C2 and between cells C2 and C4. Cell C4 has no obligation to report results of execution to any cells in application 200. Links are maintained only during the time DSF statements are transferred. Further, the writing of statements by cell C1 to cell C2 could be independent of the writing of statements by cell C2 to cell C4. In addition, cell C4 merely execute statements, and does not care where the statements come from. In FIG. 3, dashed lines are used to graphically depict the novel relationship between cells.

As pointed out above, one of the problems of the conventional architecture is that excessive amount of linkage information is retained, thereby slowing down the execution of programs. In the architecture of the present invention, there is no need to save and restore register values on a stack when cell C2 executes statements written by cell C1. There is no need to register cells in a central database prior to sending commands. There is no need to send messages back and forth to report status of execution. As a result, the application can be executed quickly.

Because there is practically no overhead in linking programs, it is possible to design an application using a large number of small cells. In a preferred embodiment, the size of the cells are small, e.g., typically about 10 kilobytes. The function of each cell is well defined and focused. As a result, there is flexibility in designing applications and the efficiency in execution improves.

A cell can also invoke another cell (e.g., cell C1 can invoke cell C5, as indicated by the double dashed line), if that cell is not already loaded and running in RAM. The invoked cell (i.e., cell C5) could be completely independent of the invoking cell (i.e., cell C1) after invocation. Thus, the invoking cell is not the boss of the invoked cell and the two cells are hierarchically at the same level. This is completely different from the prior art in which an invoking program module is at a hierarchical different level as the invoked program module.

As explained below, a cell can be implemented as an ".EXE" file (in the MS DOS or MS Windows environment), and can be loaded into RAM for execution using well known methods in accordance with the operating environment. The cell's associated DNA file can also be loaded into RAM. The invoked cell takes on the attributes stored in its DNA cell. It is also possible to modify the DNA file when the cell is invoked or while running by writing to the file (which could be an ASCII file). As a result, the architecture provide a flexible approach to build applications.

Figure 1:
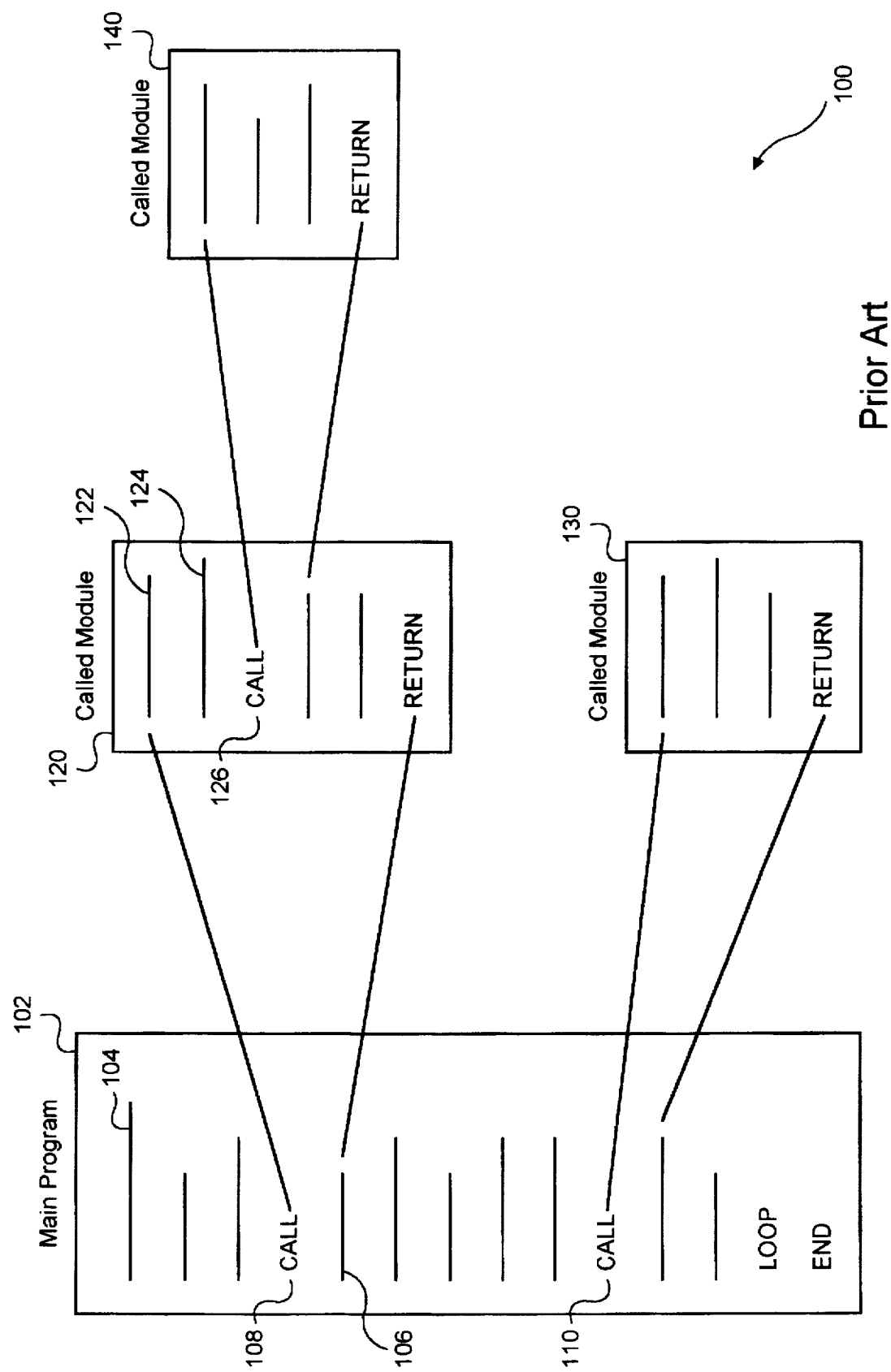
FIG. 1 is a diagram shown a prior art programming architecture.

It can be seen from FIG. 3 that the bossless architecture has a flat structure instead of a hierarchical architecture of FIGS. 1 and 2A. Each of the cells C1–C4 is an independent executable routine which is at the same hierarchical level as other executable routines. No cell functions as a boss for other cells. Consequently, this architecture is called a bossless architecture.

This architecture allows an application to start at any cell. Other cells can be invoked as needed. This architecture also allows an application to end at any cell. Because there is no chain to unwind, the cells can terminate immediately. There is no need to return to the "boss" program before exiting the application. In one embodiment of the present invention, a cell can exit the application at a predetermined time after invocation of a new cell. In another embodiment of the present invention, other cells can send a DSF statement to this cell requesting it to terminate.

Figure 4:
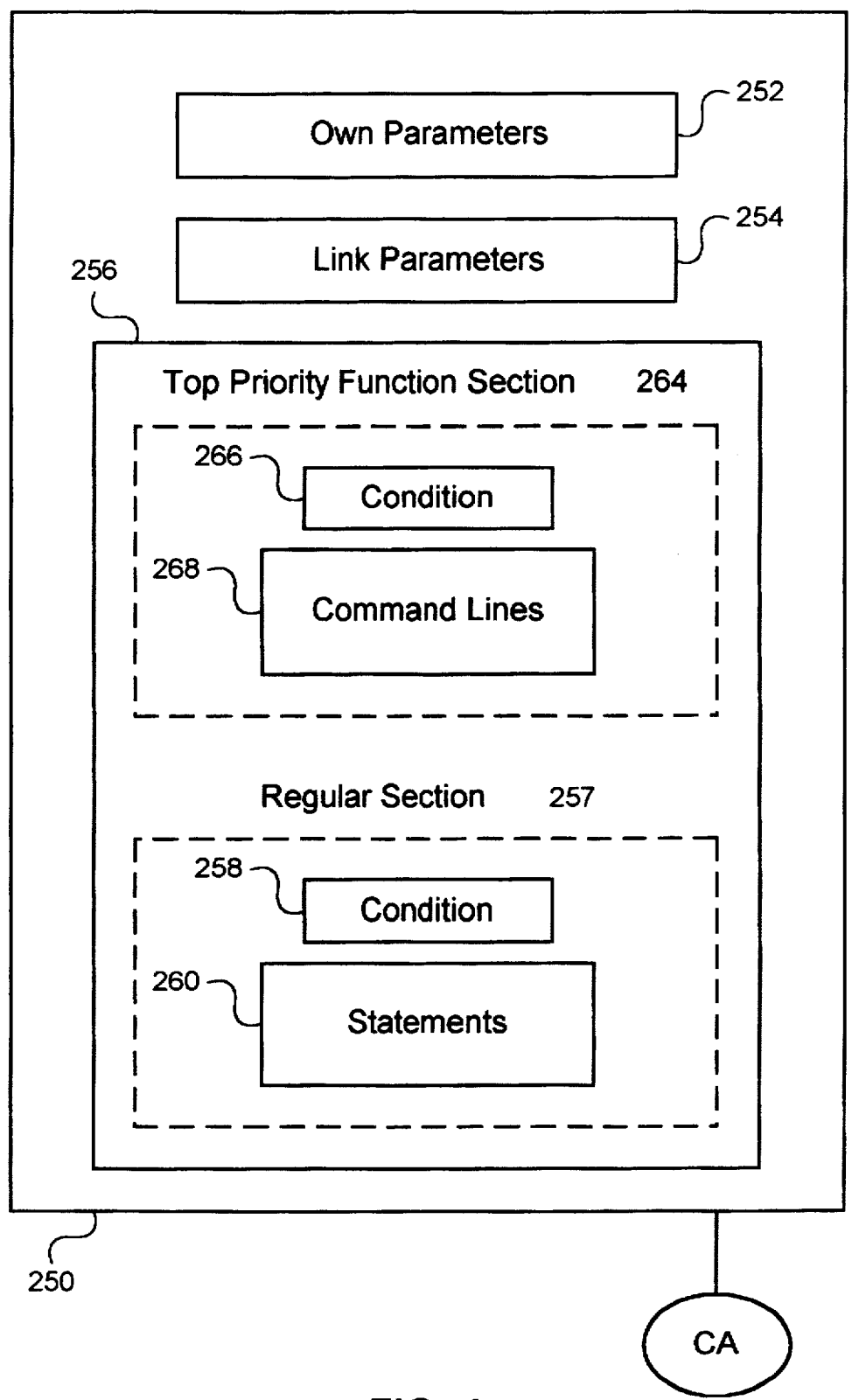
FIG. 4 shows a block diagram of the structure of a DNA file in accordance with the present invention.

FIG. 4 is a block diagram showing the logic structure of a DNA file 250 associated with a cell, such as cell CA. File 250 has a section 252 containing parameters ("own parameters") related to the characteristics of cell CA itself. For example, section 252 may contain parameters related to the way cell CA manifest itself when invoked: the window size and background color of cell CA, the name of cell CA, the names of audio files associated with its invocation and termination, etc.

File 250 also contains a section 254 containing linking parameters ("link parameters") on cells related to cell CA. Examples of the parameters contained in this section are: the names, symbols and positions of the other cells. One of the parameter is "close," which is interpreted as closing cell CA when the cell associated with this parameter is invoked.

File 250 further contains a DSF information section 256. This section contains a regular statements section 257 and a top priority function section 264. The structure of the regular section 257 and top priority function section 264 are substantially the same, except that top priority function section 264 has a higher priority in statement execution. These two sections contain individual headers for identifying the sections (e.g., each section headed by a different name or symbol).

Regular section 257 contains a "condition" section 258 and a statements section 260. Statements section 260 comprises DSF statements sent to cell CA by other cells. Statements in statements section 260 are executed sequentially. Examples of statements are "Draw Circle," "Draw Line," and "Scrolling." Each statement also contains parameters necessary for the execution of the statement (e.g., location and diameter of circles). Condition section 258 comprises three components: (a) a first pointer to the last DSF statement currently existing in statements section 260, (ii) a second pointer to the current DSF statement being processed by cell CA, and (iii) the current status of the cell. Examples of status are: ready, busy, lock, and never.

Top priority function section 264 contains a condition section 266 and a command lines section 268. The structure of condition section 266 is similar to the structure of condition section 258 (e.g., both sections contain two pointers). Command lines section 268 contains executable command lines which are sent by other cells using DSF (or similar) protocol. The command lines have a higher execution priority than the statements in statements section 260 (the details of execution priority will be discussed below in connection with FIG. 5). The command lines in command lines section 268 are executed sequentially. Examples of commands in section 268 are close, min (for minimizing a window), max (for maximizing a window), restore, etc.

It should be appreciated that the logic structure shown in FIG. 4 can be implemented using one or more physical files. Further, portions of the logical sections may intermingle physically. In one embodiment of the present invention, the DNA file is a text file. Thus, the content of the DNA file can be modified by using a regular text editor.

Statements sent by one cell to another follow the DSF protocol. A sending cell (e.g., cell CS) sets up a communication link with the DNA file 250 associated with cell CA. Specifically, it looks up the address of DNA file 250 and determines whether DNA file 250 is able to accept DSF statements (e.g., at a "ready" state) by examining its status in condition section 258. Statements will be issued by cell CS only when cell CA is ready to accept them. In one embodiment, the issuance of statements involves writing ASCII characters (e.g., the ASCII characters for "Draw Circle") to statements section 260 of DNA file 250.

When cell CS is authorized to issue statements to cell CA, cell CS reads the first pointer (in condition section 258) to the last DSF statement to determine the appropriate address to write the DSF statements. It is important not to overwrite DSF statements already existed in cell CA. Cell CS writes DSF statements to statements section 260 of DNA file 250. Cell CS also updates the first pointer in condition section 258 so as to point to the last DSF statement newly written into statements section 260. The communication link between cells CA and CA is terminated. It can be seen that cell CA and DNA file 250 do not maintain record (i.e., history) indicated that these new statements originate from cell CS.

It should be appreciated that the above described DSF protocol is only an exemplary protocol. Other protocol could be used to write DSF statements to cells. For example, different pointer structures can be used, e.g., the first pointer can point to the position after the last DSF statement. Different types of status and different ways for checking status information can be used. Further, the statements could be stored in accordance with a logic structure instead of stored physically in a sequential manner. For example, the statements could be organized into groups with the address of each group pointed to by a pointer.

Command lines are sent by one cell to another using a protocol substantially the same as the DSF protocol. Because regular statements section 257 and top priority function section 264 have different headers, the sending cell can distinguish between these two sections and write to the appropriate section. Other means for identifying these two section cam also be used (e.g., maintaining separate linked lists of statements and command lines).

Because DSF statements/commands are executed sequentially (either physically or logically), cell CA needs to complete execution of statements/commands (if any) preceding the above mentioned statements/commands written by cell CS. This set of previously written statements/commands are likely to be written by other cells (although it is also possible that it is written by cell CS in a prior communication link).

After the set of previously written statements/commands has been executed and prior to the execution of the statements/commands written by cell CS, cell CA does not have to take any action with respect to the cell which wrote the first set of statements/commands (e.g., no "return" is needed). This aspect of the present invention is different from conventional programming architecture.

Note that the communication link between cells CA and CS can be terminated prior to the execution of the first statement/command sent by cell CS (for example, the previously written DSF statements/commands have not yet been executed completely when cell CS finishes sending DSF statements to cell CA). This is different from conventional linking in which communication link between two program modules is completed only after the task relating to these two modules is executed completely.

In a different embodiment of top priority function section 264, command lines section 268 allows only one command. In this embodiment, there is no need to have pointers. Thus, condition section 266 can be removed from top priority function section 264. Other cells can write a single command to top priority function section 264 because this section is separated from other sections by a header.

Figure 5:
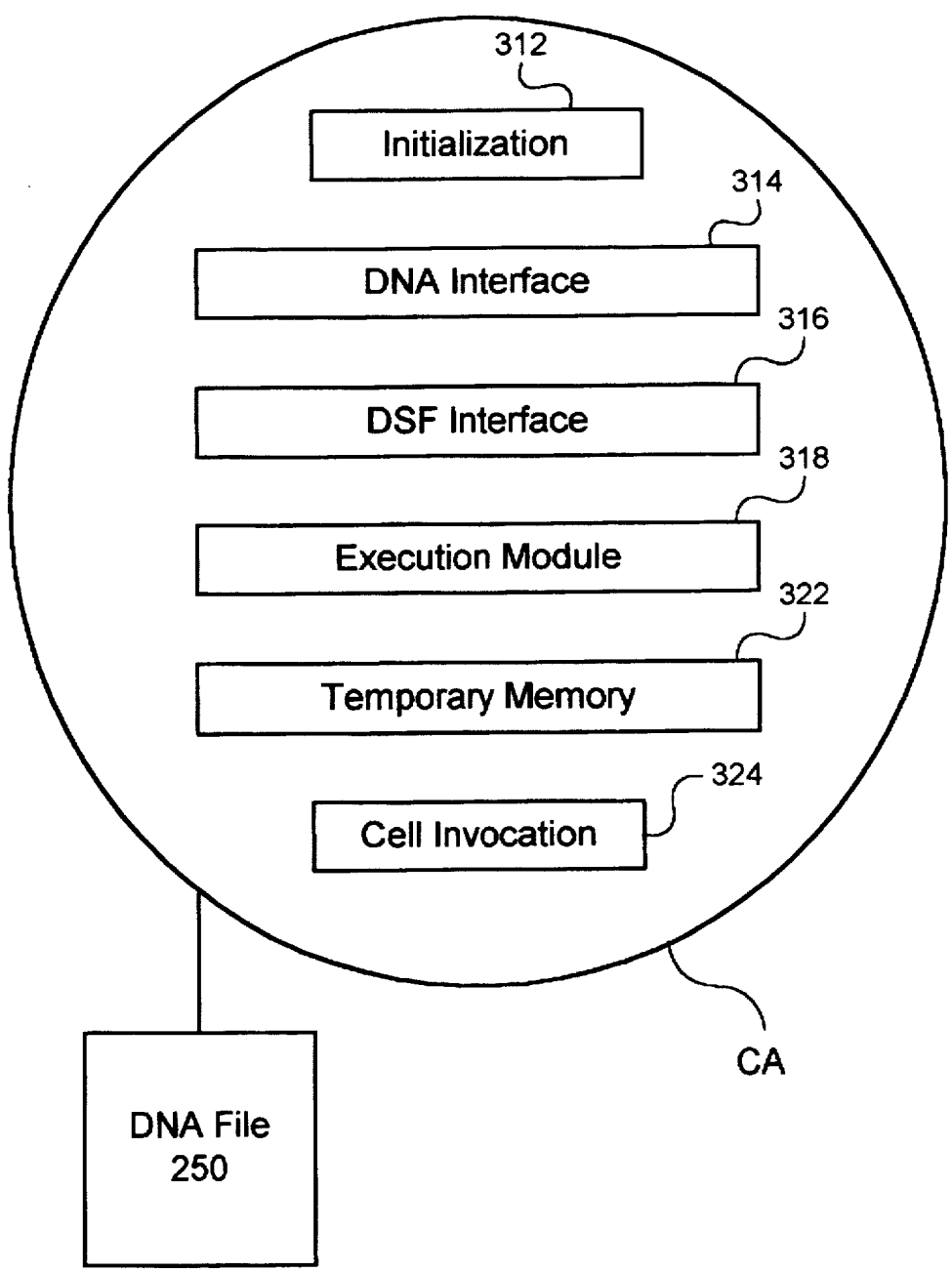
FIG. 5 shows a block diagram of the structure of a cell in accordance with the present invention.

FIG. 5 shows the structure of cell CA. It is grouped logically into a plurality of sections, each implemented using instructions executable by a computer. Cell CA contains an initialization section 312 and a DNA interface section 314. DNA interface section 314 allows cell CA to read from and write to its corresponding DNA file 250. Initialization section 312 takes care of housekeeping tasks when invoked, including reading parameters from "own parameters" section 252 of DNA file 250. Cell CA also contains a section 316 for processing DSF protocol. This section contains code (or program instructions) for sending and receiving statements/command lines using the DSF protocol.

Cell CA contains an execution section 318 containing code for automatically executing statements and command lines in DNA file 250 written by other cells. The code sequentially read and execute statements in statements section 260 of DNA file 250. After each statement is executed, cell CA branch to top priority function section 259 and executes all the command lines therein. Cell CA then executes the next statement in statement section 260.

An example is used to illustrate the execution steps. In this example, statements section 260 contains two statements, "Draw Circle" and "Draw line," while the top priority function section 259 contains one command line, "Max". When cell CA reads a "Draw Circle" statement and its associated parameters, the code will perform a graphic algorithm for drawing a circle at an appropriate place with an assigned diameter (as determined by the associated parameters). Cell CA then branches to top priority function section 259 and executes the "Max" command, which causes a window associated with cell CA to enlarge. Cell CA returns to statements section 260 and executes the next statement, i.e., the "Draw Line" statement. Cell CA executes a graphic algorithm which draws a line in accordance with the parameters associated with the "Draw Line" statement.

In the above example, if the command line in top priority function section 259 contains a "Close" command, cell CA will close itself. In this situation, the "Draw Line" statement will not be executed.

In one embodiment of the present invention, cell CA reads statements section 260 at predetermined times regardless whether statements are present in DNA file 250 (i.e., similar to a polling arrangement). In another embodiment of the present invention, a cell sends a signal to cell CA, either directly or indirectly (e.g., through an operating system), after sending statements to DNA file 250. Upon receiving the signal, cell CA executes the statements in statements section 260 until all the statements have been executed. Cell CA then waits for another signal. This embodiment is similar to an interrupt arrangement. Thus, the execution of statements is carried out automatically in both embodiments.

Cell CA contains a temporary memory section 322 for storing temporary information. As an example, it is possible to change attributes (e.g., background color and the size of the display window) of cell CA during its execution. In one embodiment of the present invention, the changed attributes are temporarily stored in temporary memory section 322 instead of immediately being written to DNA file 250. In this embodiment of cell CA, the attribute information stored in temporary memory section 322 is written into "own parameters" section 252 of DNA file 250 only when cell CA is terminated.

Cell CA also contains a cell invocation section 324 for invoking other cells. In one embodiment of the present invention, this section obtains information about the cell desired to be invoked and pass this information to a specialized cell which actually invoke the desired cell. It is also possible to incorporate the functionality of this specialized cell in the cell invocation section of cell CA and other cells.

It should be appreciated that the above mentioned sections in cell CA are grouped logically, and portions of these sections could intermingle physically.

It can be seen from the above described structures of cell CA and its associated DNA file 250 that both cell CA and DNA file 250 do not keep track of the origin of the DSF statements. A cell may accept DSF statements (stored in its associated DNA file) from many cells. After the DSF statements have been received, the linkage between the originating and destination cells is terminated. The cell executes DSF statements contained in its associated DNA file without knowledge of how the statements arrive the DNA file. As a result, there is no need to "return" to any cell.

Typically, the size of each cell is small and the function of the cell well defined. Consequently, the execution speed is fast. As a result of the small size and specialized function, the cells can be easily written to fully utilize the resources of a computer. The communication between cells using DSF is direct, with minimum amount of access to the operating system on which an application is run. As a result, the efficiency is high.

The architecture of the present invention comprises at least two cells which can communicate with each other. The cells are encapsulated program modules that are specialized for their designed tasks. Therefore, applications developed using the present architecture comprise of multiple executables which can run independently or concurrently.

The cells interact with each other using the inventive DSF protocol. Each cell can control the action of other cells. For example, a first cell can control a second cell, and the second cell can control the first cell. Therefore, no single cell has complete control over the other cells, or in other words, there is no boss. On the other hand, under conventional architectures, program modules subordinate to a boss cannot control the boss. Another unique characteristic of the present architecture is that the cell that receives a command does not keep any information of where the command came from. This lack of historical knowledge allows cells to move forward instead of going backward in a link.

The technology of the present invention is called the "digital cell technology" because the structure of program modules and the interaction between them are similar to biological cells. Some of the similarities are listed here: (i) an application is made up of many cells dynamically interacting with each other, (ii) many cells can be active at a time, (iii) the interaction of a pair of cells can be independent of interaction of other pairs of cells, (iv) control is distributed instead of centralized, and (v) each cell is associated with a DNA structure which guides the behavior of the cell.

One of the embodiments of the present invention is a multimedia application development system which runs under Microsoft's MS Windows. In this environment, cells are programs stored as ".EXE" files and typically show a window on a computer monitor when invoked. By linking these cells, a user can construct an application software just like assembling blocks. Each cell, with its specific function, is given another function or value through DSF protocol with other cells to produce a variety of applications.

Figure 6:
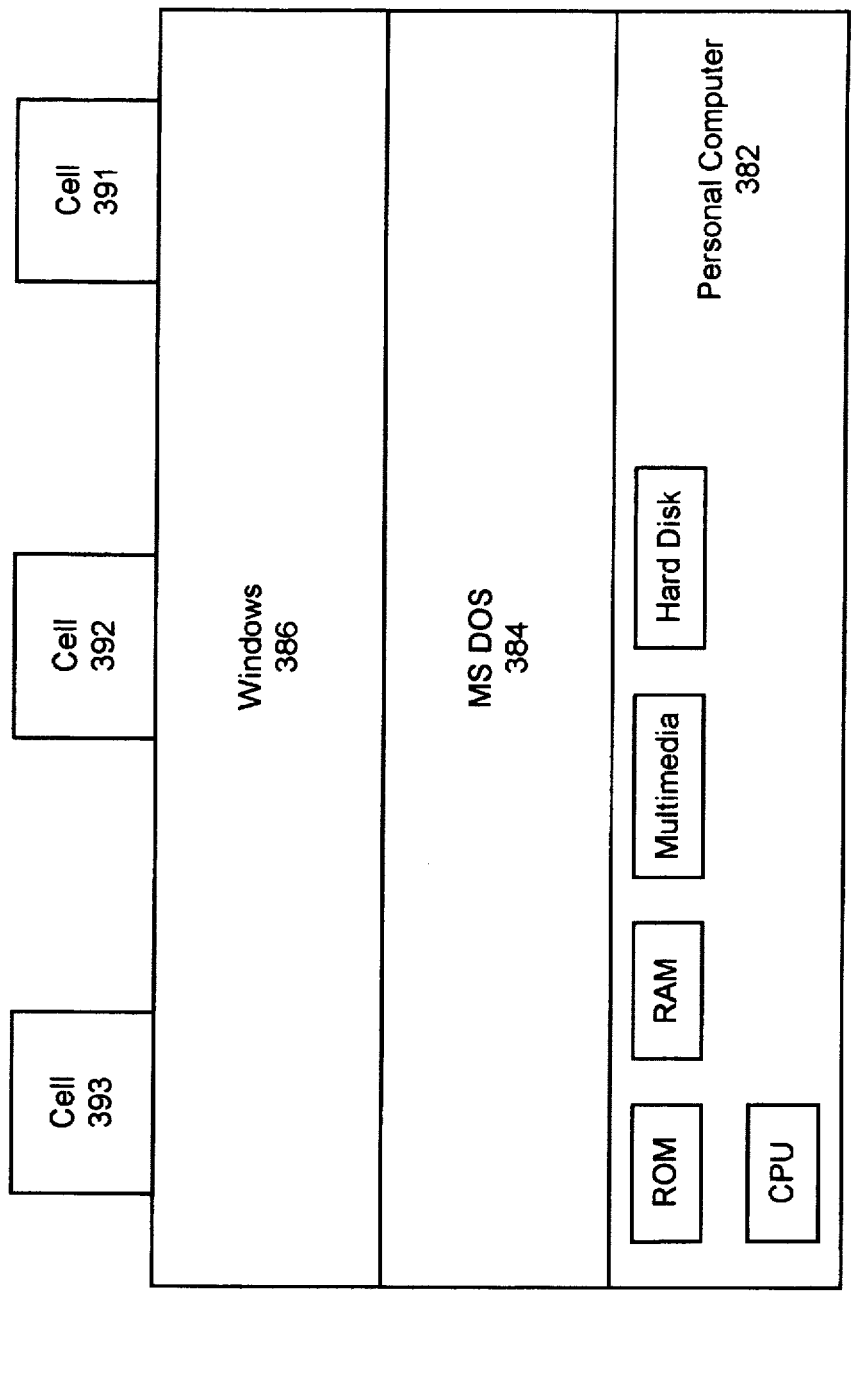
FIG. 6 is a block diagram of a computer system running an applications in accordance with the present invention.

FIG. 6 shows a block diagram of a computer system 380 running the above described application development system. Computer system 380 comprises a personal computer 382, such as an IBM compatible computer. Personal computer contains components such as a CPU, RAM, ROM, hard disk and multimedia device (e.g., sound card, CD-ROM reader, video card, etc.). Personal computer is loaded with a MS-DOS 384 and a MS Windows 386. Cells 391–393 of the present invention run on top of MS Windows 386. Some of these cells can be graphically displayed on a display device and played on a sound card of personal computer 382.

An exemplary list of cells which run under MS Windows environment together with a description of their functions is given below:

| NAME | DESCRIPTION |
| --- | --- |
| BUTTON: | Creates buttons with action attributes assigned to them. |
| VIDEO: | Enables video file (AVI) playback. |
| CONTENTS: | Displays text files (TXT) (text editor with ability to adding action attributes to the text). |
| VISUAL: | Enables display of BMP, DXF, TIFF, WRI, and TXT files with dynamic 360-degree free scrolling, multiple layer support, raster and vector overlays, and object overlays with action attributes assigned. |
| NAKAMA: | Enables more than one VISUAL cells to be linked using coordinates. Enables images in two VISUAL cells to be interlocked using an interlinked window (bird's eye view). |
| RUN: | DNA file editor and DNA file executor. Enables continuous reproduction of applications. This cell serves as the specialized cell, mentioned above, for invoking other cells. |
| COPY: | Performs file copying. |
| TITLE: | Executes Title Bar functions. |
| RESTART: | Provides user selection to exit or restart the operating system. |
| PLAYWAV: | Enables sound file (WAV) playback. |
| AREA: | Manipulates the attributes of graphics written in the VISUAL cell. |
| LIST: | Enables objects/layers to be grouped and provides instant access to the defined grouping. |

These cells are stored in memory (e.g., floppy and/or hard disk) as ".EXE" files. To effectively allocate system resources for simultaneous activation of more than one cell, the sizes of most cells are around 10 kilobytes. The exception is the VISUAL cell which is about 100 kilobytes.

A simplified example will be used to illustrate the system. Only one type of cell, the visual cell, described above, is used in this example. In this example, the system makes use of the resources of MS Windows. For example, the invocation of a cell (e.g., loading of an appropriate file as a result of clicking on an icon) and the graphic user interface (e.g., the manipulation of windows such as resizing, drag and drop, etc.) are handled by MS Windows.

The multimedia application development system needs to be installed in MS Windows. The installation involves loading files of bitmaps, cells, sound, video, etc. from removable storage media (e.g., floppy, CD-ROM, etc.) to appropriate directories in the hard disk of the computer. Programs are linked to MS Windows and icons are placed at appropriate positions. Thus, a user can invoke the development system by clicking on an icon under MS Windows. Once the development system is running, various cells can be invoked by clicking on icons associated with the cells.

Figure 7:
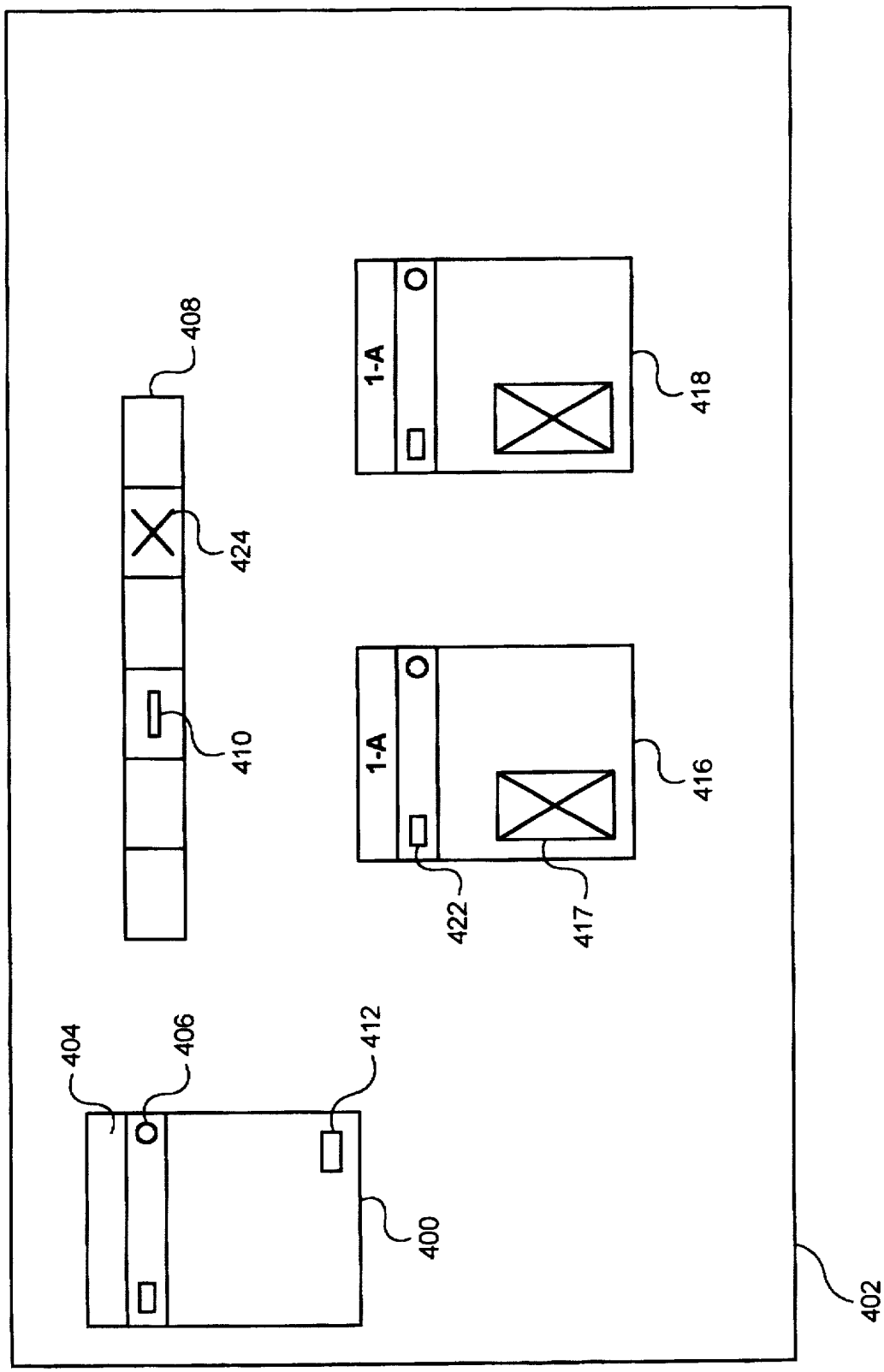
FIG. 7 shows various windows associated with visual cells during the execution of a multimedia development system in accordance with the present invention.

FIG. 7 shows a window 400 representing a first visual cell displayed on a display screen 402 under the control of MS Windows 386. Window 400 typically contains a graphic image (not shown) and a title bar 404. A user can click on an icon 406 in windows 400, and a side bar 408 is displayed. Side bar 408 contains spaces for displaying icons allowing the user to add functionalities to the first visual cell associated with window 400.

One of the spaces of side bar 408 contains an icon 410 for allowing a user to attach an icon for invoking a second visual cell to window 400. After the user clicks on icon 410, a symbol helps the user to place an icon 412 inside window 400 for representing the second visual cell. A window 430, shown in FIG. 8, then appears which allows the user to define the characteristics of the second visual cell. Side bar 408 also contains an icon 424 which allows the user to delete a visual cell placed inside window 400.

Figure 8:
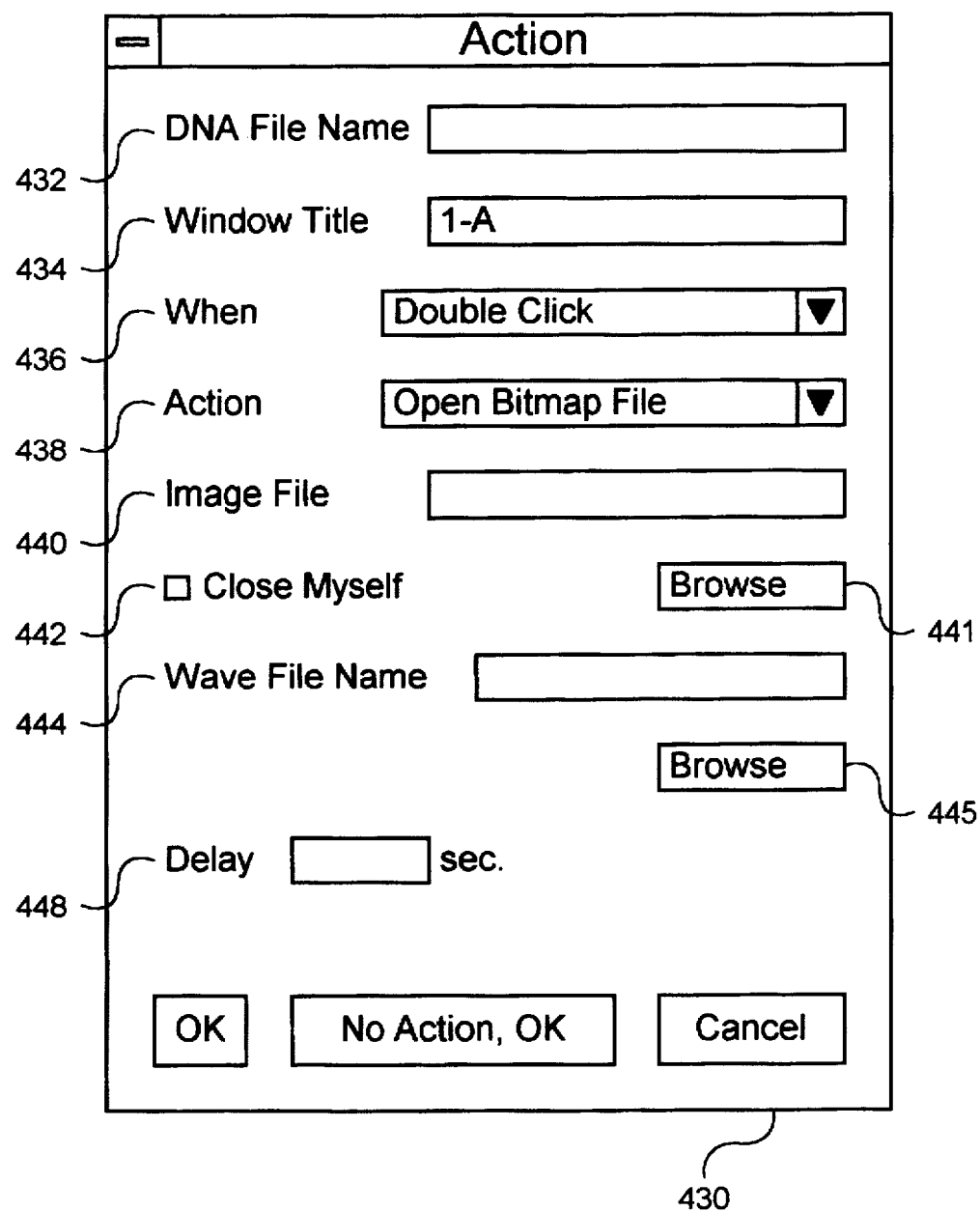
FIG. 8 shows a windows for a user to enter information to a DNA file of the present invention.

Window 430 contains a line 432 for the user to enter the name of a DNA file associated with the second visual cell. The information entered in window 430 will be stored in this DNA file. Window 430 also contains a line for the user to enter the title of a graphic window showing the second visual cell. In FIG. 8, the title "1-A" is entered in line 434. A line 436 allows the user to select the mode of invoking the second visual cell. In window 430, "double click" is selected, indicating the second visual cell is invoked upon double clicking on icon 412.

Window 430 contains a line 438 allowing the user to define the action of the second visual cell. In FIG. 8, the action selected is "open bitmap file." Thus, the action performed by the second visual cell is to open a bitmap file. A line 440 allows the user to enter an image file to be opened when the second visual cell performs its action. Window 430 contains a "browse" button 441 so as to allow the user to search for image files already stored in the computer for the purpose of entering an appropriate file in line 440. Window 430 also contains a "close myself" box 442. When selected, the first visual cell will be closed automatically when the second visual cell is invoked. This is implemented by attaching a "close" parameter to a line in the linking parameter of the DNA file associated with the first visual cell which links the first and the second visual cells.

In this embodiment, lines 440–442 are associated with the action line 438. If the action selected is "close visual cell" instead of "open bitmap file," lines 440 would be changed to allow the user to enter the DNA file of a visual cell selected to be closed after invocation of the second visual cell. In this embodiment, the second visual cell sends a "quit" DSF statement to the designated visual cell after invocation for the purpose of closing that cell.

It is possible to use window 430 to input a variety of actions to be performed by the second visual cell. The two examples above are for illustrative purposes only.

Window 430 contains a line 444 which allows the user to enter an audio file associated with the invocation of the second visual cell. Window 430 contains a "browse" button 445 so that the user can search for audio (typically having an extension of "WAV") files already stored in the computer for the purpose of entering an appropriate file in line 444.

Window 430 contains a line 448 allowing the user to enter a delay. This parameter allows the second visual cell to manifest itself a predetermined time interval after icon 412 is clicked on.

It should be appreciated that the format of and information requested by window 430 is exemplary. Depending on the design objective and creativity of a programmer, window 430 could have other formats and request different types of information. When window 430 is closed (after all essential information has been entered by the user), the information contained therein is stored in the DNA file indicated on line 432. In this embodiment, the DNA file is an ASCII text file stored in the hard disk.

When a user clicks on icon 412, a window 416 is opened to represent one instance of the second visual cell. Window 416 has characteristics defined by its associated DNA file. For example, window 416 contains the title "1-A" (as determined from line 434 of window 430) and a graphic image 417 associated with the image file defined in line 440. The position of window 416 can be moved around using normal MS Windows methods (i.e., drag and drop). When a user clicks on icon 412 again, another window 418 of the second visual cell appears simultaneously with window 416. In this case, two copies of the second visual cell are loaded into the RAM, each is associated with the same DNA file.

It is possible to terminate the first visual cell while the second visual cell is active. In FIG. 7, each visual cell window has a "close" button, such as button 422 in window 416, for allowing the user to close the window. In the development system shown in FIG. 7, the user can close window 400 associated with the first visual cell while windows 416 and 418 continue to be active on display screen 402.

It is also possible to close window 400 using a statement issue by the second visual cell. As explained before, line 438 of FIG. 8 can be set to "close visual cell" and the name of the visual cell is set to the first visual cell. When the second visual cell is invoked, it will send a DSF statement to the DNA file associated with the first visual cell for the purpose of closing the first visual cell.

Figure 9:
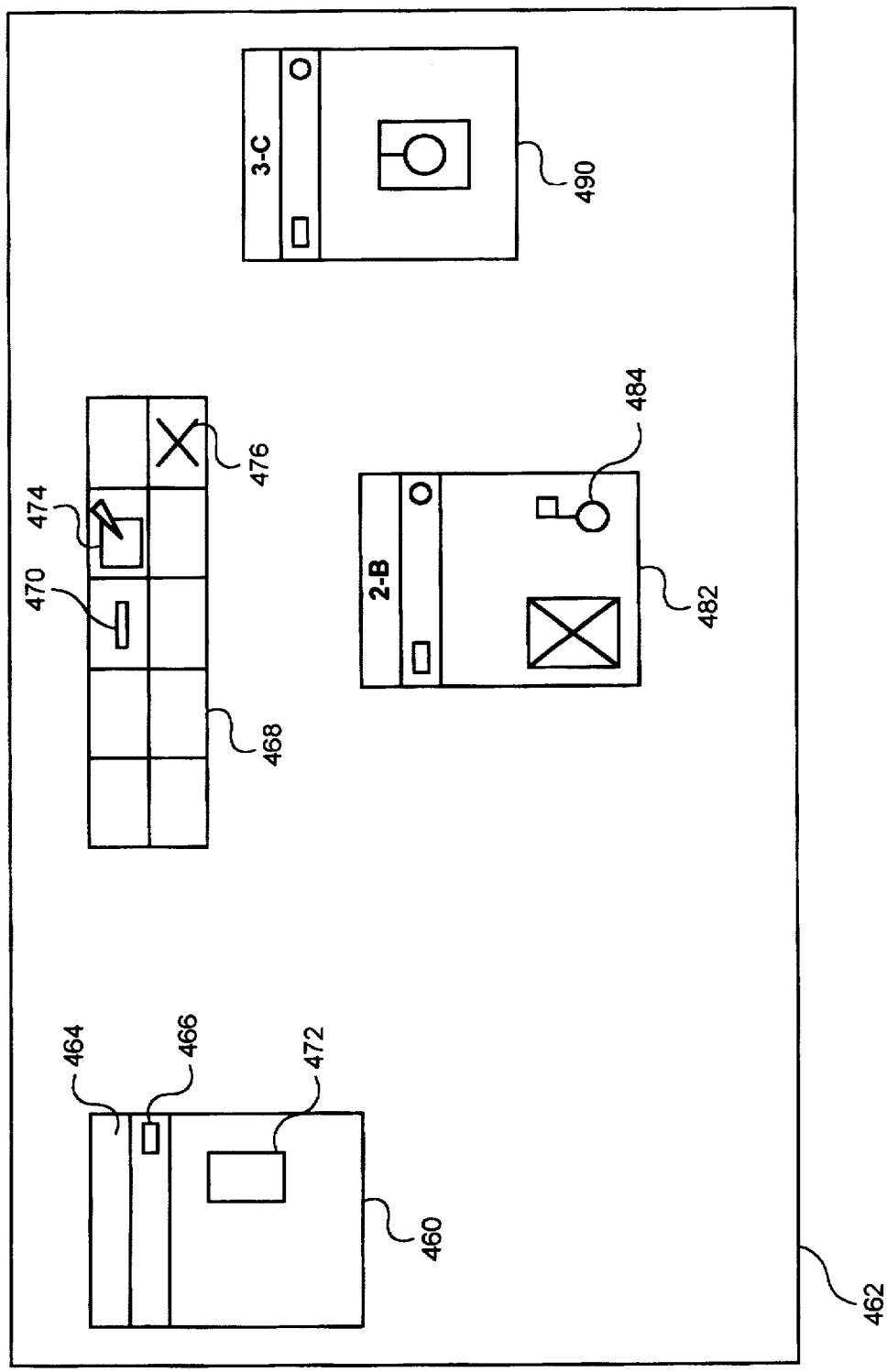
FIG. 9 shows various windows associated with a button cell and visual cells during the execution of a multimedia development system in accordance with the present invention.

An example showing two cells of different types, a visual cell and a button cell, is described below. FIG. 9 shows a window 460 representing a button cell displayed on a display screen 462 under the control of MS Windows 386 of FIG. 6. Window 460 contains a title bar 464. A user can click on an icon 466 in window 460 and a side window 468 is displayed. Side window 468 contains spaces for displaying icons allowing the user to add buttons to, and remove buttons from, window 460.

One of the spaces of side window 468 contains an icon 470 for allowing a user to attach a button to window 460. After the user clicks on icon 470 in side window 468, a symbol appears to help the user to place a button 472 at a desired position inside window 460. This new button can later be clicked on by the user and a sequence of user-defined activities will occur. Side window 468 also contains an icon 476 which allows the user to remove an existing button inside window 460.

Figure 10:
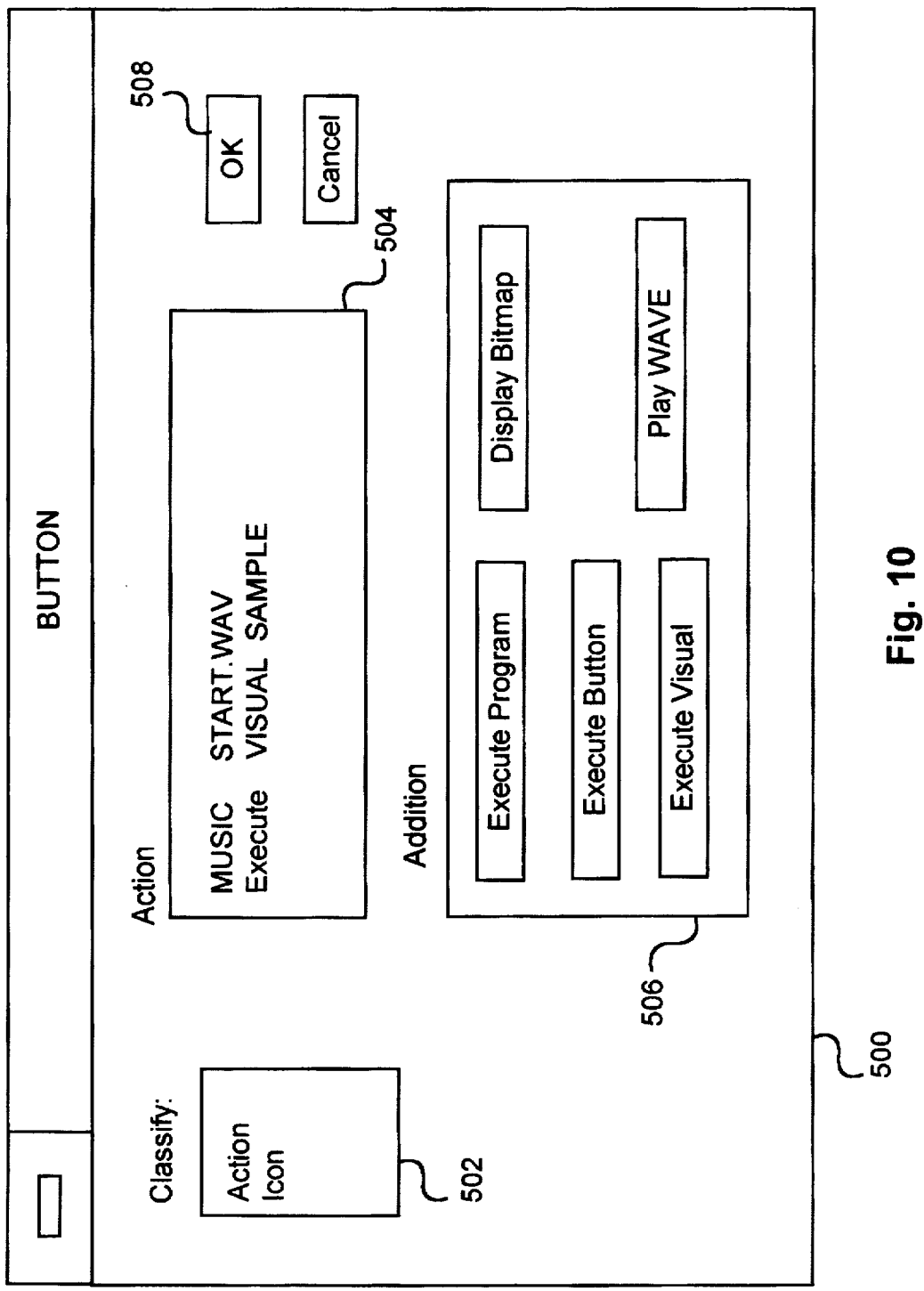
FIG. 10 is a window showing the format for a user to specify a button in accordance with the present invention.

The user can then click on another icon 474 in side window 468 which opens a windows 500, shown in FIG. 10, allowing the user to define the characteristics of button 472. Window 500 contains an area 502 showing a list of items for allowing the user to select the types of information to be entered into window 500. For example, selection of "action" allows the user to enter the actions to be taken by button 472 when it is invoked while selection of "icon" allows the user to choose an icon to represent the button cell instead of using a simple rectangular button. The list may contain other items. Depending on the choice of item in the list, the appearance of, and information requested by, window 500 will be different.

In list 502, "action" is selected. As a result of such choice, an "action" window 504 and "addition" window 506 are displayed. Action window 504 shows the actions of button 472 when invoked. The content of action window 504 is selected by user using addition window 506.

Figure 11:
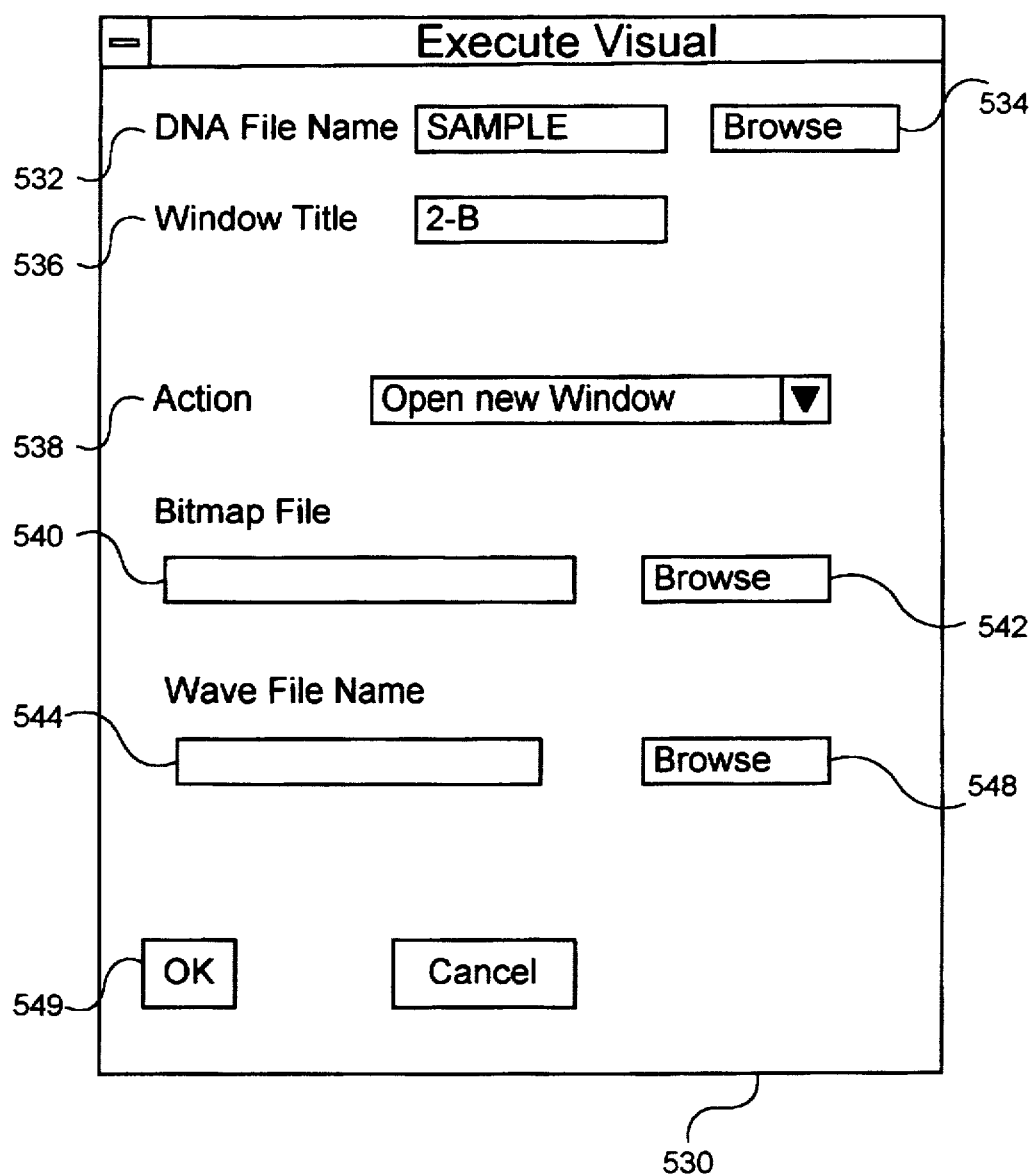
FIG. 11 is a window showing the format for a user to specify a visual cell associated with a button cell in accordance with the present invention.

Addition window 506 contains a plurality of actions, such as "execute program," "execute button," "execute visual," "play wave," and "display bitmap." The user can click on any one of these actions and a window for allowing the user to further define the action will be displayed. An example of such a window for "execute visual" is shown in FIG. 11. The user can select one or more actions in addition window 506.

The selected action is displayed on action window 504. For example, action window 504 contains a line "MUSIC START.WAV" indicating that the "play wave" action in addition window 506 has previously been selected. A window associated with "play wave" (not shown) allows the user to indicate that an audio file named "START.WAV" should be played. Action window 504 also contains a line "EXECUTE VISUAL SAMPLE" indicating that the "execute visual" action in addition window 506 has previously been selection. When the user clicks on an "OK" button 508, the information entered in window 500 is stored in a DNA file associated with this button cell.

The specification of visual cell SAMPLE is now described. A window 530 of FIG. 11 shows the type of information requested upon selecting the "execute visual" action of addition window 506. Window 530 contains a line 532 for the user to enter the DNA file of the visual cell desired to be invoked. In this case, the name is "SAMPLE" which corresponds to the "Execute VISUAL" line in action window 504. Window 530 contains a "browse" button 534 in case the user needs to find a list of preexisting DNA filename. Window 530 also contains a line 536 for the user to enter the title of the visual cell window. In this case, the title is "2-B." Window 530 contains a line 538 for allowing the user to enter the action desired. Examples of actions are "open new window," "open new vector," "open new movie," etc. The content of the next line in window 530, line 540, depends on the selection in line 538. In this example, line 540 allows the user to enter the name of a bitmap file because the action in line 538 is "open new window." If the action in line 538 is "open new vector" or "open new movie," line 540 will request the name of a vector file or a video file, respectively. Window 530 contains a "browse" button 542 allowing the user to find a desired preexisting bitmap file. Window 530 contains a line 544 allowing the user to enter an audio file when the visual cell is invoked. Window 530 contains a "browse" button 548 allowing the user to select a desired preexisting WAV file. When the user clicks on an "OK" button 549, the information entered in window 530 will be used to specify the selected visual cell associated with button 472. This information, along with the rest of the information entered in window 500, will later be stored in the DNA file of button 472.

When all the information relating to button 472 has been entered and stored, button 472 can be invoked. Returning now to FIG. 9, side window 468 can be removed by clicking on icon 466. Removing side window 468 changes window 460 from an edit mode (for allowing users to add, modify and remove buttons) to an active mode (for allowing users to invoke buttons in window 460). In this embodiment, button 466 acts as a toggle for displaying and removing side window 468. After side window 468 is removed, the user can click on button 472 to invoke its associated actions: play a piece of music and display a window 482 corresponding to visual cell SAMPLE. The title of SAMPLE's window is "2-B", which corresponds to line 536 of FIG. 11. In this example, window 482 contains an icon 484 which allows another visual cell to be invoked. This icon 484 has been previously placed in visual cell SAMPLE in a manner similar to the operation discussed above in connection with FIG. 7. The user can click on icon 484 to display another window 490 corresponding to a different visual cell.

It should be appreciated that the format of and information requested by windows 500 and 530 is exemplary. Depending on the design objective and creativity of a programmer, windows 500 and 530 could have other formats and request different types of information.

Another example of an application running under the system of FIG. 6 is a hotel index system displayed on the screen of a computer. The application can be formed by assembling a collection of cells. Any of the cells can be invoked first. For example, a user of the application can invoke (e.g. by clicking on) a cell which is designed to show a window containing the index. Another cell becomes active when a user clicks on an item in the index window. This new cell display itself as another window that shows a regional map. The user can click on an item on the map window to activate a third cell, which includes text or pictures in its display. In this way, more than one cell is active simultaneously, creating an application program.

Figure 12:
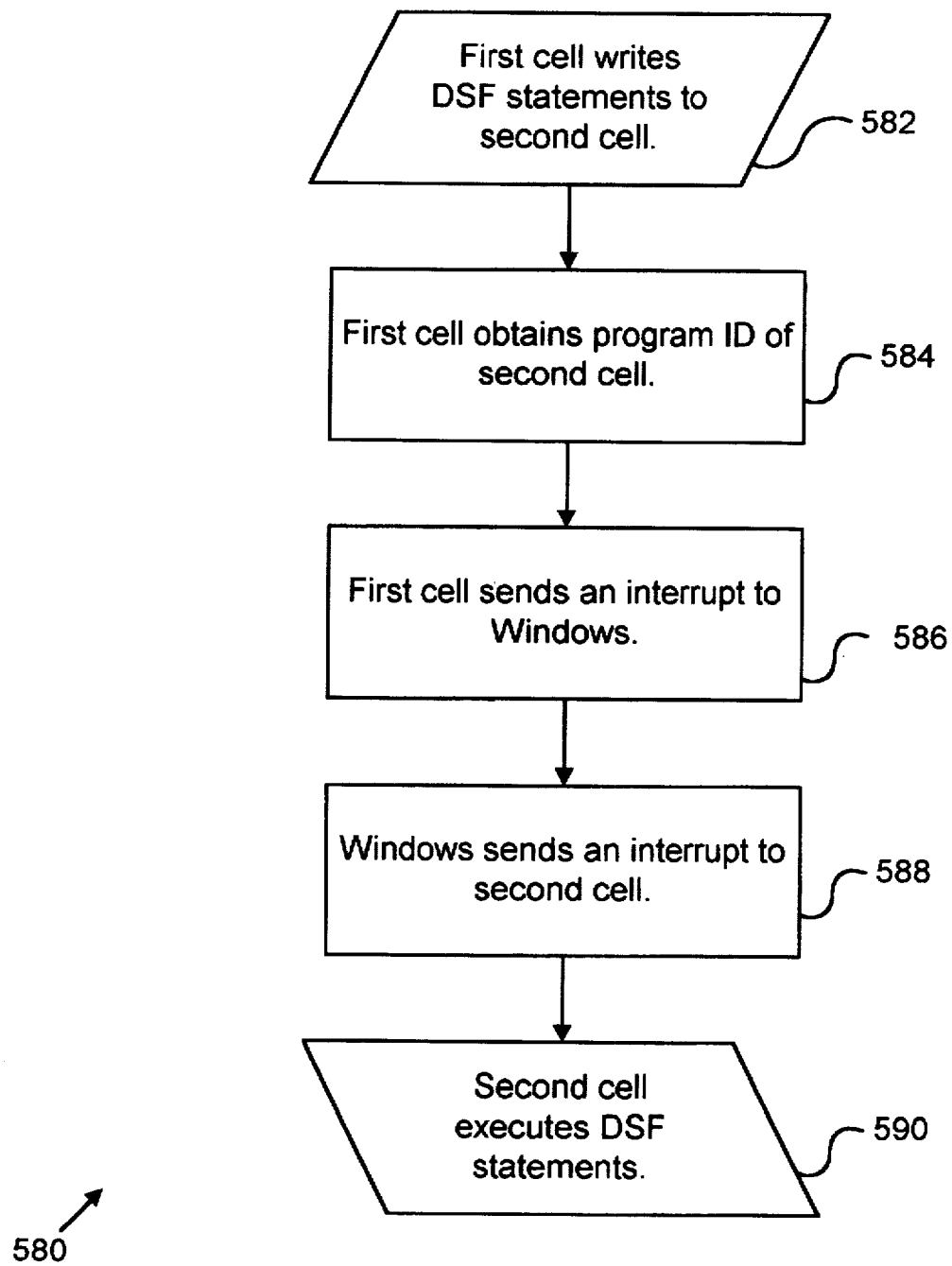
FIG. 12 is a flow chart showing a cell notification procedure in accordance with the present invention.

As mentioned above, in one embodiment of the present invention, a cell can indirectly notify another cell after writing DSF statements thereto. FIG. 12 is a flow chart 580 showing an embodiment of indirect notification of cells. In this example, MS Windows 386 of FIG. 6 assigns a program identification to each program (including the cells) running on it. After a first cell writes a set of DSF statements to a DSF file of a second cell (step 582), it obtains the program identification of the second cell (step 584). The first cell sends an interrupt to MS Windows 386 requesting it to send an interrupt to the second cell (step 586). In response to this request, MS Windows 386 sends an interrupt to the second cell (step 588). The second cell then executes the DSF statement previously written to its associated DNA file (step 590).

It should be appreciated that the MS Windows in the above flow chart is merely an example of an operating system. Other operating systems, such as MS DOS and Macintosh OS, can be used to perform the interrupt in place of MS Windows.

The invention has been described with reference to a specific exemplary embodiment thereof. Various modification and changes may be made thereunto without departing from the broad spirit and scope of the invention. The specification and drawings are, accordingly, to be regarded in an illustrative rather than a restrictive sense; the invention is limited only by the provided claims.

What is claimed is:

1. A method for linking program cells to form an application program in a windows-based environment, each of said cells containing program instructions and being associated with a separate file, said method comprising the steps of:

providing a first program cell executing as a first window in said windows-based environment, said first cell associated with a first file containing data used by said first cell;

providing a second program cell executing as a second window in said windows-based environment, said second cell associated with a second file containing data used by said second cell;

providing a third program cell executing as a third window in said windows-based environment, said third cell associated with a third file containing data used by said third cell;

sending, upon an operation on said second window, a first set of one or more statements by said second cell to said first file associated with said first cell;

subsequently sending, upon an operation on said third window, a second set of one or more statements by said third cell to said first file associated with said first cell, said second set of statements being placed in a logical position following said first set of instructions; and executing, by said first cell, statements in said first file in accordance with their logical positions thereby executing said first set of instructions prior to executing said second set of instructions, said first cell initiating execution of said second set of statements without initiating communication with said second cell.

2. A system for executing computer applications, comprising:

a plurality of program cells each containing program instructions;

a plurality of files of a first type each associated with one of said plurality of program cells, each file of said first type guiding behavior of its associated program cells;

a plurality of multimedia files;

at least a first one of said program cells associating with a first file of said first type which makes references to at least a first one of said multimedia files and at least a second program cell;

said first program cell, when invoked, retrieving said first multimedia file, thereby creating a multimedia presentation, and invoking said second program cell;

said second program cell associating with a second file of said first type which makes references to at least a second one of said multimedia files;

said second program cell, when invoked, retrieving said second multimedia file, thereby creating a multimedia presentation; and means for terminating said second program cell without informing said first program cell.

3. The system of claim 2 wherein said first and said second files of said first type each has a first section for receiving statements sent by other cells, and said second program cell containing program instructions for sending a first set of one or more statements to said first file of said first type;

said first program cell containing program instructions for automatically executing said first set of statements without returning result of executing said first set of statements to said second program cell, said first program cell further containing program instructions for sending a second set of one or more statements to said second file of said first type; and said second program cell containing program instructions for automatically executing said second set of statements without returning result of execution to said first program cell.

4. The first file of said first type of claim 3 comprising:

a first section for receiving statements sent by other program cells, and a second section containing indicia of status of said first file of said first type, said second program cell examining said indicia prior to sending said first set of statements.

5. The first file of said first type of claim 4 wherein said second section contains a first pointer associated with one of said statements in said first file of said first type, said first pointer being changeable for reflecting addition of said first set of statements to said first file of said first type.

6. The first file of said first type of claim 5 wherein said second section further contains a second pointer pointing to a statement in said first file of said first type which is currently being executed by said first program cell.

7. The first file of said first type of claim 4 wherein said indicia has at least a first status and a second status, said first status indicating that said first file of said first type is ready to accept new statements and said second status indicating that said first file of said first type is not able to accept new statements.

8. The first file of said first type of claim 4 further comprising a set of parameters relating to characteristics of said first program cell, said first program cell containing program instructions for using said parameters when said first program cell is invoked.

* * * * *